Figure 3:
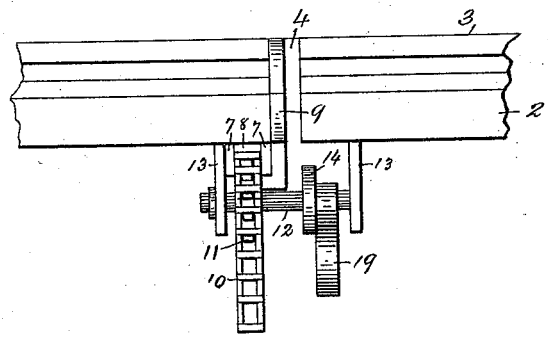

(No Model.)  2 Sheets—Sheet 1.
J. BALSLEY.
CLAMPING MECHANISM FOR WOOD WORKING MACHINES.
No. 418,880. Patented Jan. 7, 1890.
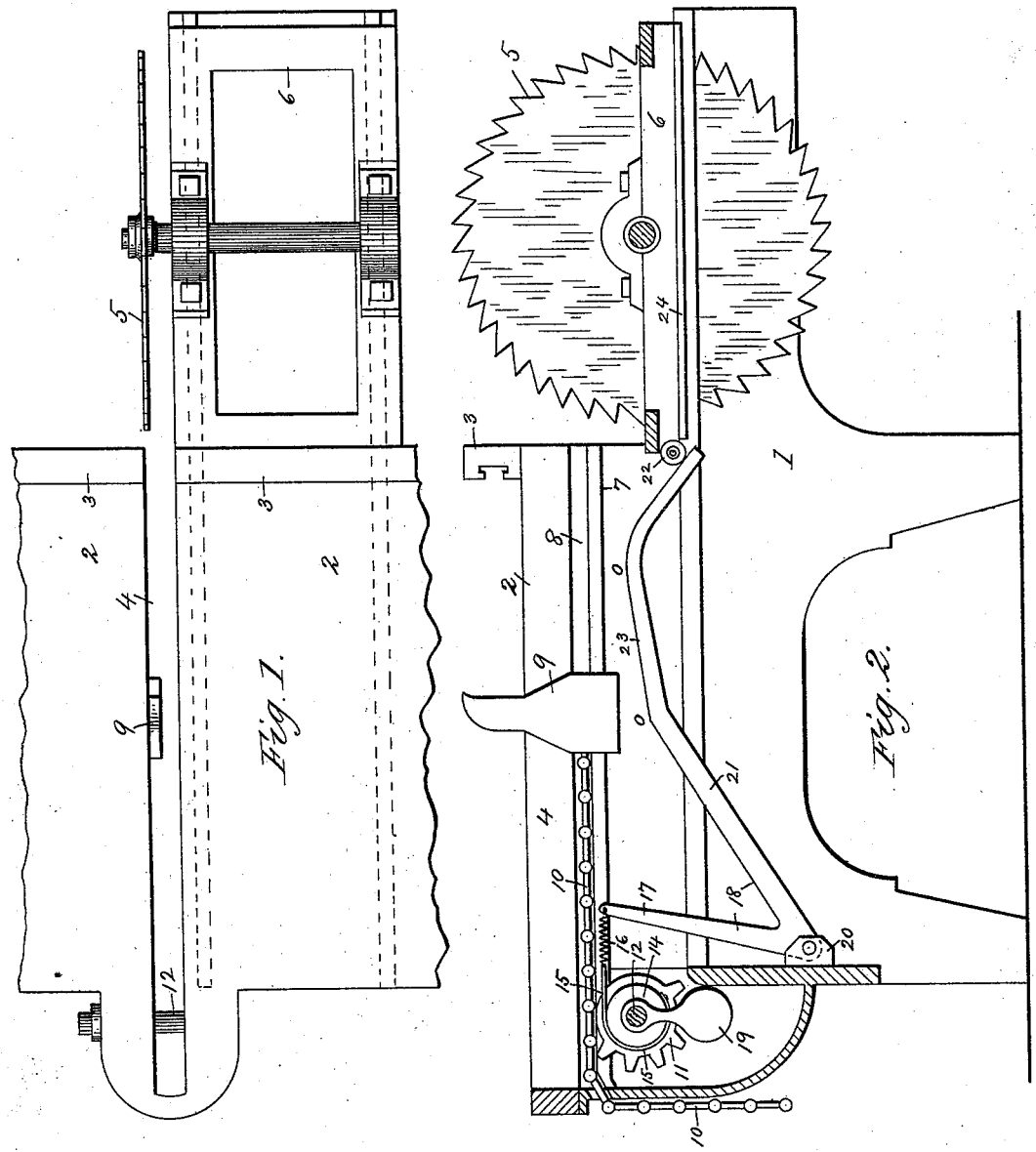
Witnesses:
T. R. Stuart,
Parker H. Sweet Jr.
Inventor:
Joseph Balsley.
By Marble + Mason,
Attorneys.

(No Model.) 2 Sheets—Sheet 2.

J. BALSLEY.
CLAMPING MECHANISM FOR WOOD WORKING MACHINES.

No. 418,880. Patented Jan. 7, 1890.

Witnesses:
T. R. Stuart,
Parker T. Sweet Jr.

Inventor:
Joseph Balsley.
By Marble + Mason,
Attorneys.

UNITED STATES PATENT OFFICE.

JOSEPH BALSLEY, OF SEYMOUR, INDIANA.

CLAMPING MECHANISM FOR WOOD-WORKING MACHINES.

SPECIFICATION forming part of Letters Patent No. 418,880, dated January 7, 1890.

Application filed October 31, 1889. Serial No. 328,779. (No model.)

*To all whom it may concern:*

Be it known that I, JOSEPH BALSLEY, a citizen of the United States, residing at Seymour, in the county of Jackson and State of Indiana, have invented certain new and useful Improvements in Clamping Mechanism for Wood-Working Machines; and I do hereby declare the following to be a full, clear, and exact description of the invention, such as will enable others skilled in the art to which it appertains to make and use the same.

My invention relates, generally, to woodworking machines, and particularly to that class thereof which is employed for sawing or cutting off headings or blanks, billets, dados, and the like, in which the saw-carriages or cutter-heads travel across the stationary lumber-supporting tables of the machine, and is designed as an improvement upon the invention disclosed in an application for Letters Patent filed by me June 28, 1889, Serial No. 315,959, in which invention is provided novel and improved clamping or dogging mechanism for securely holding the lumber in position upon stationary lumber-supporting tables while the machines are in operation; and my present invention consists of the novel and improved constructions and arrangements or combinations of parts hereinafter fully disclosed in the description, drawings, and claims.

The object of my present invention is to provide further improvements in the construction and arrangement or combination of parts of such dogging or clamping mechanism which will securely hold lumber in position while being operated upon, which will automatically release the same after the sawing or cutting operation is finished and the saw-carriage returns to its starting or normal position, and which can be readily and quickly adjusted for holding any width of lumber within the capacity of the lumber-table. This object is accomplished by the mechanism shown in the accompanying drawings, forming part of this specification, in which the same reference numerals and letters indicate the same parts, and in which—

Figure 1 represents a plan view of the machine, the ends of the lumber-supporting table being broken away; Fig. 2, a longitudinal section of the same, the section being taken transversely of the lumber-supporting table or through the slot therein, and also shows in side elevation the circular saw, as well as the movable stop or dog, the partly toothed or cogged sprocket-wheel, and the other devices for clamping and releasing the lumber during the operation of the machine; Fig. 3, a broken longitudinal section of the lumber-supporting table, looking toward the forward portion thereof, and showing the sprocket-chain in position upon its wheel; and Fig. 4, a similar view showing the stop or dog actuating wheels and the guide-groove, with the sprocket-chain omitted.

Figure 4:
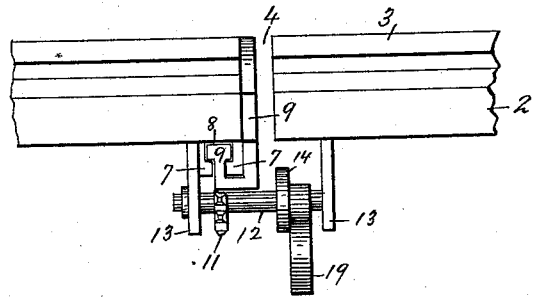

In the drawings, the numeral 1 indicates the main frame of the machine, which may be made of metal or wood, or of both combined, in any preferred manner; 2, the lumber-supporting table, which is suitably and rigidly secured to the frame of the machine and provided with the vertical strip or flange 3 along its rear edge and formed with the transversely-extending slot 4, which leads from edge to edge thereof, and through which the circular saw 5 passes back and forth, which is journaled and revolved upon the saw-carriage 6, which is arranged on a line beneath the lumber-table 2 and supported and reciprocated by any of the usual or well-known mechanisms. Upon the under side of this table are formed or secured the strips 7, between which is formed the T-shaped recess or guide-groove 8, which extends across said table and within which fits and slides the correspondingly-shaped lower portion of the movable stop or dog 9; also, within said guide-groove fit and slide the closely-jointed flat links of the sprocket-chain 10, the inner end of the same being suitably secured to said stop or dog, while its outer or forward portion is passed over the partly toothed or cogged sprocket-wheel 11, which is rigidly fixed to the shaft 12, that is journaled in suitable bearings mounted in the brackets 13, secured to the front end of the main frame, as shown in Figs. 3 and 4. Owing to the close connection of the links of the sprocket-chain 10, when the same is moved back and forth within the guide-groove 8 by the rotation of the sprocket-wheel 11, said links act to as positively operate the movable stop or dog 9 as would be due to the employment of a continuous rod or bar.

To the shaft 12, at the right side of the sprocket-wheel 11, as shown in Figs. 3 and 4, is fixed another wheel 14, which may be either another sprocket-wheel or a wheel with a smooth periphery, as desired, and to the periphery thereof is secured one end of a sprocket-chain or a flexible smooth band 15, the other end thereof, which passes over said wheel, being fastened to the front end of a strong spiral spring 16, which is fastened at its rear end to the vertical arm 17 of a bell-crank lever 18, and thus practically forms a part or continuation of said chain or band, the purpose thereof being to resist or compensate for all shock or strain upon said chain or band between said lever and wheel. To the shaft 12, at the right side of the wheel 14, is also rigidly fixed a weight 19, which normally hangs downwardly and holds the stop or dog actuating devices stationary while the saw-carriage is not being reciprocated.

The bell-crank lever 18 is hinged or pivoted at its elbow within the three-sided bracket 20, which is secured to the front end of the main frame of the machine, whereby said lever is permitted to be rocked or vibrated in a vertical plane. The long rearwardly-projecting arm 21 of said elbow-lever is downwardly curved for a short distance from its end for the purpose of being gradually and gently depressed when it comes into contact with the small anti-friction roller 22, which is placed at a suitable point on the saw-carriage; also, for a suitable distance forward of the curved end of this arm of said lever, as between the points o and o, said arm is formed with a straight portion 23, so that when said arm is depressed by the forward movement of the saw-carriage it will be parallel with the bottom thereof, where a track or guide-groove 24 is provided of sufficient length to hold said arm down until said carriage has been moved to the front of the machine.

Under the construction and arrangement of the several parts of my invention, as described, and shown in the drawings, it will be obvious that the following operations and advantages result: that the lumber is placed against the vertical strip or flange 3 on the rear edge of the stationary lumber-table 2; that the stop or dog 9 is movable back and forth in the guide-groove 8 by means of the closely-connected links of the sprocket-chain 10, which is movable in the same groove as said dog and has the same function as a continuous rod or bar, which acts to rigidly hold said dog against the lumber while the same is being cut or sawed to release said dog therefrom and to permit the same to be adjusted into different positions for holding varying widths of lumber; that the omission of a portion of the teeth or cogs from the upper surface of the sprocket-wheel 11, as it stands when not in operation, permits the stop or dog 9 and the chain 10 to be moved back and forth across the table 2 whenever it becomes necessary to adjust the position of said dog to suit the width of the lumber without said chain coming in contact with the cogs or even the periphery of said wheel; that when said stop or dog has been moved about an inch or so from the edge of the lumber to be operated upon, and when the saw-carriage 6 has been started across beneath the table 2, the anti-friction roller 22 will immediately depress the long arm 21 of the pivoted bell-crank lever 18 and draw back the vertical arm 17 thereof, to which are connected the spiral spring 16 and the chain or band 15; that, as the other end of said chain or band is secured to the periphery of the wheel 14, the backward pull upon said spring and band will partially revolve said wheel and the shaft 12, and also the partly toothed or cogged sprocket-wheel 11, and will raise the weight 19 from its normal position, as shown in Fig. 2, the result being that such teeth or cogs as are on said wheel will come into engagement with the links of the sprocket-chain 10 and move the same rearwardly, which will force and firmly hold the stop or dog 9 against the edge of the lumber while the same is being sawed or otherwise worked; that when the carriage 6 has been returned to its starting-point in rear of the table 2 the long arm 21 of the bell-crank lever will have passed out of the guide-groove 24 and from beneath the small anti-friction roller 22, and that it will be raised by the forward pull upon the upper end of the vertical arm 17 of said lever, which is due to the descent of the weight 19, which will partially revolve the shaft 12, the wheel 14, and the sprocket-wheel 11 forwardly, the result being that the blank portion of said sprocket-wheel is brought to its top, as shown in Fig. 2, leaving the chain 10 and the stop or dog 9 free to be subsequently moved back and forth, as may be desired or necessary, for accommodating the latter to different widths of lumber; that minor changes can be made in the construction and arrangement of some of the parts of my invention without substantially departing therefrom— as, for instance, a spring can be employed instead of the weight 19 and still accomplish the same result; that my invention is capable of use in connection with existing machines without material reorganization thereof; that it is simple, strong, not liable to get out of order, and comparatively cheap to manufacture, and that it has wider capability or range of adjustment than those devices in which the movable dogs are adjustable vertically, and is less complicated than those machines in which the saw-carriages are stationary and the lumber-tables reciprocated, and in which a series of pulleys and belts are operated by treadle-power to advance and clamp the movable dogs against the lumber.

Having thus fully described the construction and arrangement of combination of the several parts of my invention, its operation, and advantages, what I claim as new is—

1. In a clamping or dogging mechanism for sawing-machines, the combination, with a stationary lumber-supporting table formed with a transverse slot and provided with a guide-groove at one side of said slot and with a vertical strip or flange on its rear edge, of a movable stop or dog arranged and supported at its lower end within said guide-groove, and means for operating said stop or dog, substantially as and for the purpose described.

2. In a clamping or dogging mechanism for sawing-machines, the combination, with the main frame and the movable saw-carriage, of a stationary lumber-supporting table formed with a transverse slot and provided with a guide-groove at one side of said slot and with a vertical strip or flange on its rear edge, a sprocket-chain and a vertical movable stop or dog arranged and supported at its lower end within said guide-groove, and means for operating said chain and dog, substantially as and for the purpose described.

3. In a clamping or dogging mechanism for sawing-machines, the combination, with a stationary lumber-supporting table formed with a transverse slot and provided with a guide-groove at one side of said slot and with a vertical strip or flange on its rear edge, of a sprocket-chain and a vertical movable stop or dog arranged and supported at its lower end within said guide-groove, and a sprocket-wheel for operating said chain and dog, substantially as described.

4. In a clamping or dogging mechanism for sawing-machines, the combination, with a stationary lumber-supporting table formed with a transverse slot and provided with a guide-groove at one side of said slot and with a vertical strip or flange on its rear edge, of a sprocket-chain, a vertical dog arranged and supported at its lower end within said guide-groove, a partly-cogged sprocket-wheel, the shaft upon which it is fixed, and the weight, also secured to said shaft, substantially as and for the purpose described.

5. The combination, with a transversely-slotted table provided with a vertical strip or flange on its rear edge, of a movable dog, a sprocket-chain secured thereto, a partly-cogged sprocket-wheel, a shaft upon which said wheel is fixed, another wheel and a weight, also fixed to said shaft, and means for partially revolving said shaft and wheels from the saw-carriage, substantially as described.

6. The combination, with a transversely-slotted table provided with a vertical strip or flange on its rear edge, of a movable dog, a sprocket-chain secured thereto, a partly-cogged sprocket-wheel, a shaft upon which said wheel is fixed, another wheel and a weight, also fixed to said shaft, and means for partially revolving said shaft and wheels from the saw-carriage, said means including a bell-crank lever, substantially as described.

7. The combination, with a transversely-slotted table provided with a vertical strip or flange on its rear edge, of a movable dog, a sprocket-chain secured thereto, a partly-cogged sprocket-wheel, a shaft upon which said wheel is fixed, another wheel and a weight, also fixed to said shaft, and means for partially revolving said shaft and wheels from the saw-carriage, said means including a bell-crank lever, a chain or band connecting said wheel and lever, and the saw-carriage for operating said lever, substantially as described.

8. The combination, with a transversely-slotted table provided with a vertical strip or flange on its rear edge, of a movable dog, a sprocket-chain secured thereto, a partly-cogged sprocket-wheel, a shaft upon which said wheel is fixed, another wheel and a weight, also fixed to said shaft, and means for partially revolving said shaft and wheels from the saw-carriage, said means including a bell-crank lever, a chain or band connecting said wheel and lever and provided with a spiral spring intermediate of its inner end and the vertical arm of said lever, and the saw-carriage for operating said lever, substantially as described.

9. The combination, with a transversely-slotted table provided with a vertical strip or flange on its rear edge, of a movable dog, a sprocket-chain secured thereto, a partly-cogged sprocket-wheel, a shaft upon which said wheel is fixed, another wheel and a weight, also fixed to said shaft, and means for partially revolving said shaft and wheels from the saw-carriage, said means including a pivoted bell-crank lever having a vertical arm and a long rearwardly-projecting arm, a chain or band connecting the vertical arm of said lever and wheel, and a saw-carriage for depressing and releasing the long arm of said lever, substantially as described.

10. The combination, with a transversely-slotted table provided with a vertical strip or flange on its rear edge, of a movable dog, a sprocket-chain secured thereto, a partly-cogged sprocket-wheel, a shaft upon which said wheel is fixed, another wheel and a weight, also fixed to said shaft, and means for partially revolving said shaft and wheels from the saw-carriage, said means including a pivoted bell-crank lever having a vertical arm and a long rearwardly-projecting arm, a chain or band connecting said wheel and the vertical arm of said lever and provided with a spiral spring intermediate of its inner end and the upper end of the vertical arm of said lever, and the saw-carriage for depressing and releasing the long arm of said lever, substantially as described.

11 The combination, with a vertical stationary strip or flange, a movable stop or dog, and a sprocket-chain attached to said dog, of means for actuating said dog and chain, said means including a pivoted bell-crank lever provided with a vertical arm and a long rearwardly-extending arm having a straight portion and a curved rear end, and a saw-carriage for operating said lever, substantially as described.

12. The combination, with a vertical stationary strip or flange, a movable stop or dog, and a sprocket-chain attached to said dog, of means for actuating said dog and chain, said means including a pivoted bell-crank lever provided with a vertical arm and a long rearwardly-extending arm having a straight portion and a curved rear end, and a saw-carriage for operating said lever, provided with an anti-friction roller and a guide-groove, substantially as described.

13. The combination, with a transversely-slotted table provided with a vertical strip or flange on its rear edge, of a movable dog, a sprocket-chain secured thereto, a partly-cogged sprocket-wheel, a shaft upon which said wheel is fixed, another wheel and a weight, also fixed to said shaft, and means for partially revolving said shaft and wheels from the saw-carriage, said means including a pivoted bell-crank lever provided with a vertical arm and a long rearwardly-extending arm having a straight portion and a curved rear end, and a saw-carriage provided with an anti-friction roller and a guide-groove, substantially as described.

In testimony whereof I affix my signature in presence of two witnesses.

JOSEPH BALSLEY.

Witnesses:
PHILIP LAUGEL,
JNO. C. HAGARTY.